(12) United States Patent
Araki

(10) Patent No.: US 9,218,224 B2
(45) Date of Patent: Dec. 22, 2015

(54) ELECTRONIC APPARATUS, INFORMATION PROCESSING METHOD, AND RECORDING MEDIUM STORING INFORMATION PROCESSING PROGRAM

(75) Inventor: Ryoji Araki, Fukuoka (JP)

(73) Assignee: RICOH COMPANY, LTD., Tokyo (JP)

( * ) Notice: Subject to any disclaimer, the term of this patent is extended or adjusted under 35 U.S.C. 154(b) by 302 days.

(21) Appl. No.: 13/033,934

(22) Filed: Feb. 24, 2011

(65) Prior Publication Data

US 2011/0225600 A1    Sep. 15, 2011

(30) Foreign Application Priority Data

Mar. 12, 2010 (JP) ................................. 2010-056699

(51) Int. Cl.
*G06F 3/00* (2006.01)
*G06F 9/54* (2006.01)

(52) U.S. Cl.
CPC ............ *G06F 9/54* (2013.01); *G06F 2209/541* (2013.01)

(58) Field of Classification Search
None
See application file for complete search history.

(56) References Cited

U.S. PATENT DOCUMENTS

| 2002/0015042 | A1* | 2/2002 | Robotham et al. ............ 345/581 |
| 2004/0111704 | A1* | 6/2004 | Kim et al. ..................... 717/116 |
| 2006/0041896 | A1* | 2/2006 | Yagi ............................... 719/330 |
| 2006/0106945 | A1* | 5/2006 | Westervelt et al. ........... 709/246 |
| 2007/0008583 | A1  | 1/2007 | Araki |
| 2007/0055678 | A1* | 3/2007 | Fung et al. .................... 707/100 |
| 2007/0064892 | A1* | 3/2007 | Ando ........................ 379/114.28 |
| 2011/0041144 | A1  | 2/2011 | Araki |

FOREIGN PATENT DOCUMENTS

| JP | 2007-049677 | 2/2007 |
| JP | 2008-003833 | 1/2008 |
| JP | 2011-039787 | 2/2011 |
| JP | 2011-041009 | 2/2011 |

OTHER PUBLICATIONS

Jun Ohta and three others, Mastering leading-edge XML & Java technologies !: Learning Web services "seriously"; Part 5 Overview of and setting environment for "JWSDP", Java World, IDG Japan, Mar. 1, 2004, vol. 8, No. 3, pp. 165-170.

* cited by examiner

*Primary Examiner* — H S Sough
*Assistant Examiner* — Carina Yun
(74) *Attorney, Agent, or Firm* — IPUSA, PLLC

(57) ABSTRACT

A disclosed electronic apparatus in which an application program is installable includes an interface information extracting unit configured to extract interface information of a method from an intermediate code of a first application program; and an interface providing unit configured to provide an interface for the method indicated by the interface information, wherein the interface providing unit calls the first application program for the method corresponding to the identification information in response to a request including the identification information of the method.

12 Claims, 11 Drawing Sheets

FIG.8

```
public class Scan2Pdf implements Xlet {
...

public synchronized void initXlet(XletContext context){
    ....
  } public synchronized void startXlet(){
    ....
  } public synchronized void pauseXlet() {
    ....
  } public synchronized void destroyXlet(boolean unconditional){
    ....
  } public boolean tiffToPdf(String inFile,String outFile){
    ....
  }
}
```

FIG.9

```
<?xml version="1.0" encoding="utf-8"?>
<wsdl:definitions ···. >

<wsdl:message name="tiffToPdfRequest">                          ~e3
  <wsdl:part name="inFile" type="xsd:string"/>
  <wsdl:part name="outFile" type="xsd:string"/>
</wsdl:message>

<wsdl:message name=" tiffToPdfResponse">                        ~e3
  <wsdl:part name="getResultReturn" type="xsd:boolean"/>
</wsdl:message>
                                                                ~e4
<wsdl:portType name="tiffToPdf">
  <wsdl:operation name="tiffToPdf" parameterOrder="inFile outFile">
    <wsdl:input name="tiffToPdfRequest" message="impl:tiffToPdfRequest"/>
    <wsdl:output name="tiffToPdfResponse" message="impl:tiffToPdfResponse"/>
  </wsdl:operation>
</wsdl:portType>

<wsdl:binding name="tiffToPdfSoapBinding" type="impl:tiffToPdf">
  ···.
  <wsdl:operation name="tiffToPdf">                             ~e5
    ······.
  </wsdl:operation>
</wsdl:binding>

<wsdl:service name="tiffToPdfService">
  <wsdl:port name="tiffToPdf" binding="impl:tiffToPdfSoapBinding">
    <wsdlsoap:address location="http://localhost:8080/tiffToPdf"/>   ~e6
  </wsdl:port>                                    `~e61
</wsdl:service>

</wsdl:definitions>
```

ELECTRONIC APPARATUS, INFORMATION PROCESSING METHOD, AND RECORDING MEDIUM STORING INFORMATION PROCESSING PROGRAM

BACKGROUND OF THE INVENTION

1. Field of the Invention

The present invention generally relates to an electronic apparatus, information processing method, and recording medium storing information processing program, and more specifically, to an electronic apparatus which can install a program, information processing method, and recording medium storing information processing program.

2. Description of the Related Art

An example image forming apparatus, mainly called a multifunction peripheral or an integrated machine, may install an application platform (application operating environment) provided with a published Application Program Interface (API) in the example image forming apparatus as in Patent Document 1.

The image forming apparatus is enabled to easily carry out a functional expansion by installing a new application after the image forming apparatus is delivered to a user and the user starts to use the image forming apparatus.

Meanwhile, plural applications may have a function in common with the plural applications. Generally speaking, the function in common is extracted by a program module which is provided as a component as a function module. The plural applications can prevent the redundant development by using the function module.

The application is not a server application previously supposed to be used by another application and an application for carrying out the process ended in the application.

However, it is difficult to know in advance which function is used by plural applications. Especially, a function inherent in a specific user and except for the generalized function is generally installed in an application which realizes the function. However, the function inherent in the specific user may be used by another application. In this case, a development work becomes cumbersome to extract the function from the application in which the inherent function is already installed. Especially, when the application including the function is developed by another vendor, it becomes very difficult to produce the function module.

Patent Document 1: Japanese Laid-Open Patent Application No. 2007-49677

SUMMARY OF THE INVENTION

Accordingly, embodiments of the present invention-provide a novel and useful electronic apparatus, an information processing method, and a recording medium storing an information processing program solving one or more of the problems discussed above.

One aspect of the embodiments of the present invention may be to provide an electronic apparatus in which an application program is installable including an interface information extracting unit configured to extract interface information of a method from an intermediate code of a first application program; and an interface providing unit configured to provide an interface for the method indicated by the interface information, wherein the interface providing unit calls the first application program for the method corresponding to identification information in response to a request including the identification information of the method.

Additional objects and advantages of the embodiments will be set forth in part in the description which follows, and in part will be clear from the description, or may be learned by practice of the invention. Objects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE DRAWINGS

FIG. 8 illustrates a defined example of a method in an intermediate code of the SDK application.

FIG. 9 illustrates an example of Web Services Description Language (WSDL).

DETAILED DESCRIPTION OF THE PREFERRED EMBODIMENTS

A description is given below, with reference to the FIG. 1 through FIG. 11 of embodiments of the present invention. Reference symbols typically designate as follows:

10: Image forming apparatus;
11: Controller;
12: Scanner;
13: Printer;
14: Modem;
15: Operations panel;
16: Network interface;
17: SD card slot;
30: User terminal;
31: Web browser;
80: SD card;
111: CPU;
112: RAM;
113: ROM;
114: HDD;
221: Standard application;
222: Application administration service;

223: SDK application;
224: SDK platform;
225: Control service;
226: OS;
2241: Virtual machine;
2242: Application administrating unit; and
2243: Application server.

Figure 1:
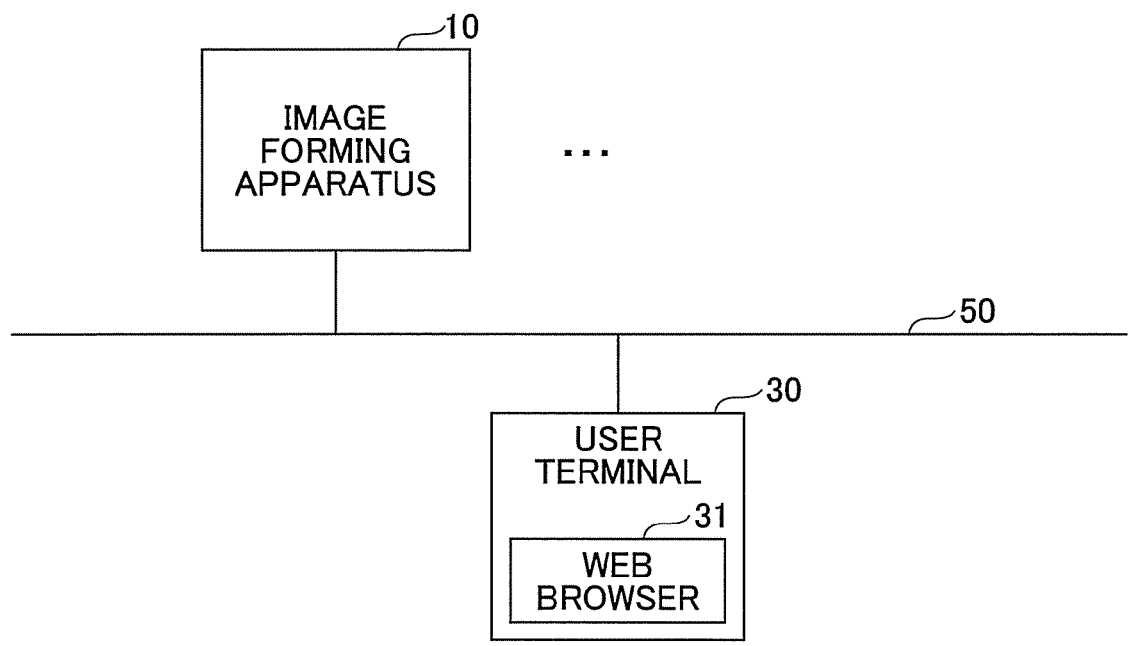
FIG. 1 is a schematic view for showing a system configuration according to an embodiment of the present invention.

Hereinafter, the Embodiment is described with reference to FIG. 1 through FIG. 11. FIG. 1 is a schematic view for showing a system configuration according to an embodiment of the present invention.

Referring to FIG. 1, plural image forming apparatuses 10 and plural user terminals 30 are mutually connected via a network 50 (wired or wireless network) such as a Local Area Network (LAN) in a single office location.

The image forming apparatus 10 is an example of the electronic apparatus. The image forming apparatus 10 is a multifunction peripheral which can realize at least two functions among printing, scanning, copying, and a FAX transmission with one casing. However, the image forming apparatus 10 may have one function among printing, scanning, copying, and the FAX transmission. The present embodiment may be applicable to various electronic apparatuses such as a home electric appliance other than the image forming apparatus 10.

The user terminal 30 is an information processing apparatus for remotely using a function installed in the image forming apparatus 10. The user terminal 30 may be a personal computer (PC), a personal digital assistant (PDA), a portable phone or the like. The user terminal 30 includes a WEB browser 31. The WEB browser 31 is a so-called WEB browser. WEB contents represented by HyperText Markup Language (HTML) data are displayed by the display device and the WEB browser 31 of the user terminal 30. The WEB contents are not limited to HTML data. Various data which can be plugged in the WEB browser 31 and displayed by the display device are included in the WEB contents in the embodiment.

Figure 2:
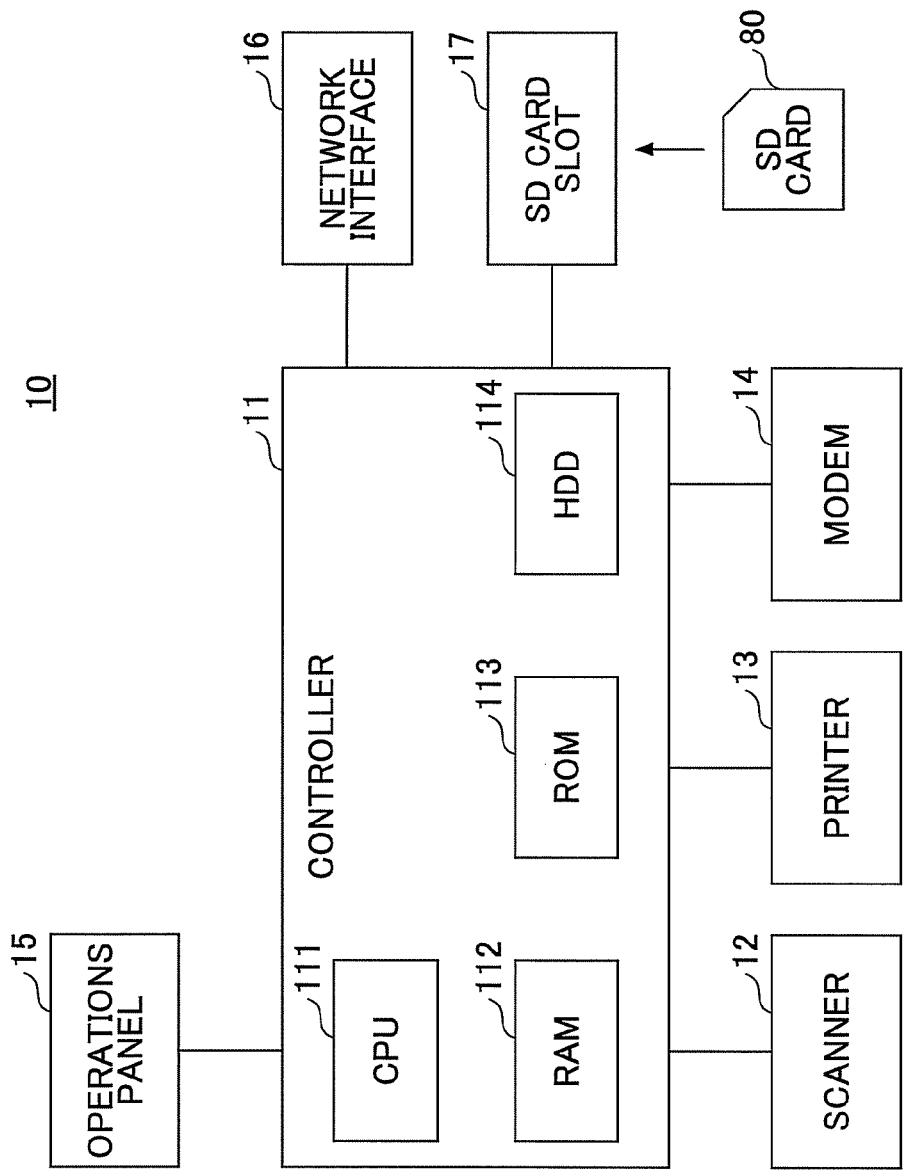
FIG. 2 illustrates a hardware configuration example of an image forming apparatus of an Embodiment of the present invention.

FIG. 2 illustrates the hardware configuration of the image forming apparatus of the embodiment. Referring to FIG. 2, the image forming apparatus 10 includes hardware such as a controller 11, a scanner 12, a printer 13, a modem 14, an operations panel 15, a network interface 16, and an SD card slot 17.

The controller 11 includes a CPU 111, a RAM 112, a ROM 113, an HDD 114, and so on. Various programs and data used by the various programs are stored in the ROM 113. The RAM 112 is used as a memory area for loading the programs, a work area for the loaded programs, or the like. The CPU 111 implements various functions by processing the programs loaded into the RAM 112. The HDD 114 records programs, various data used by the programs, or the like.

The scanner is hardware for reading image data from a manuscript. The printer 13 is hardware for printing the print data on a print paper. The modem 14 is hardware for connecting the image forming apparatus 10 to a telecommunication line (not illustrated) and is used for sending and receiving the image data with fax communications. The operations panel 15 is hardware provided with an input unit for receiving an input from a user such as a button and a display unit (display area) such as a liquid crystal panel. The network interface 16 is hardware for connecting the image forming apparatus 10 to a wired or wireless network such as a LAN. The SD card slot 17 is used to read a program recorded in the SD card 80. Said differently, not only the programs stored in the ROM 113 but also the programs stored in the SD card 80 may be loaded into the RAM 112 and executed by the image forming apparatus 10. However, a recording medium other the SD card 80, such as the USB memory and the CD-ROM may be used.

Figure 3:
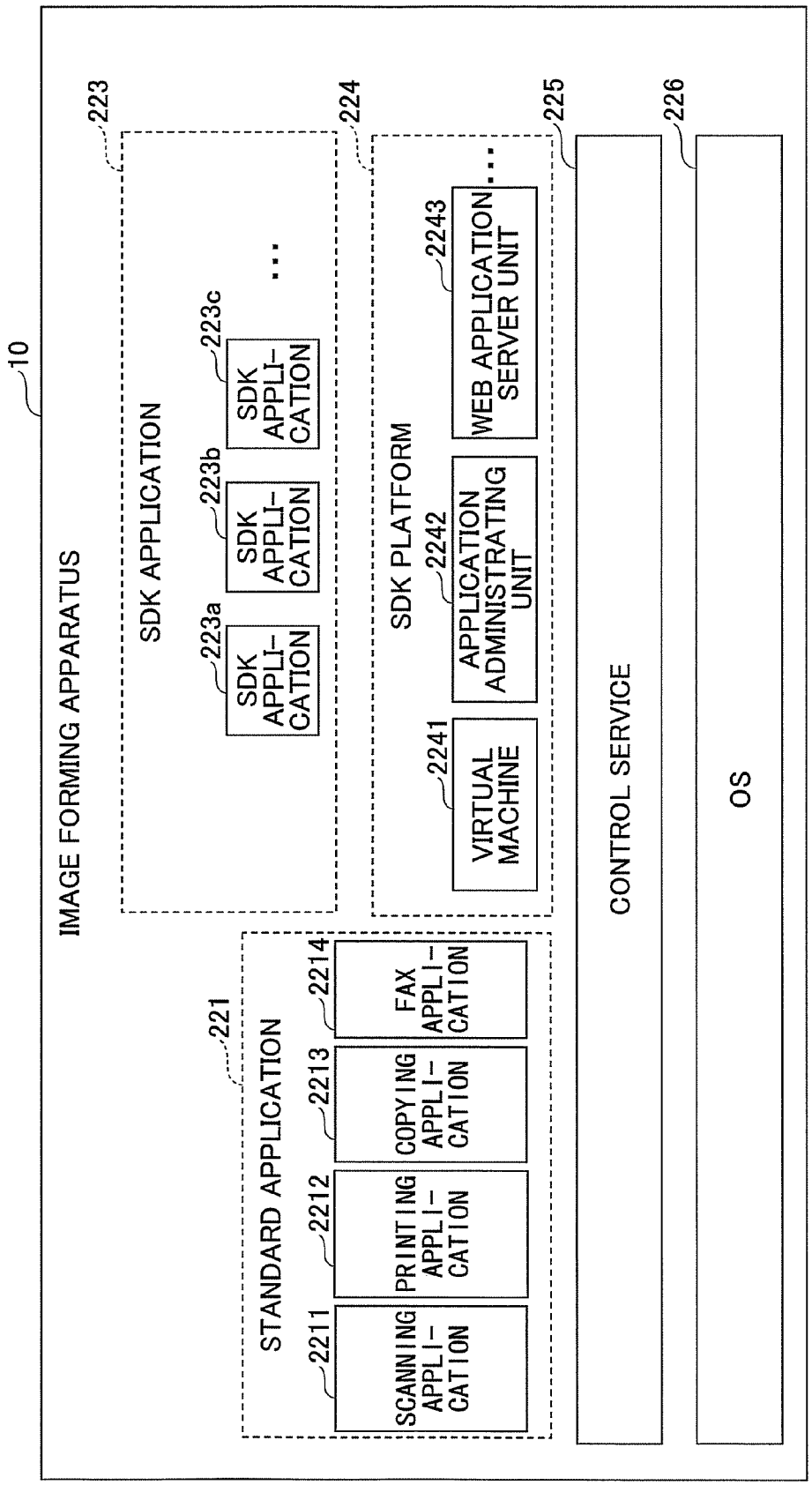
FIG. 3 illustrates a software configuration of the image forming apparatus of an Embodiment of the present invention.

FIG. 2 illustrates an example software configuration of the image forming apparatus 10 of the embodiment. Referring to FIG. 3, the image forming apparatus 10 includes a standard application 221, an SDK application 223, SDK platform 224, a control service 225, and an OS 226. The SDK stands for "System Development Kit".

The OS 226 stands for a so-called operating system (OS). Various software components installed in the image forming apparatus 10 function as processes or threads.

The standard application 221 is a group of applications ordinarily preinstalled in the image forming apparatus 10 before delivery of the image forming apparatus 10. Referring to FIG. 2, the scan application 2211, the print application 2212, the copy application 2213, and the FAX application 2214 are illustrated. The scan application 2211 carries out a scanning job. The print application 2212 carries out the printing job. The copy application 2213 carries out a copying job. The FAX application 2214 carries out facsimile transmitting and receiving jobs.

The control service 225 is a software module group providing functions for controlling various hardware resources to upper applications. The control service 124 may include a network communication function, a scanner control function, a printer control function, a memory administration function, or the like.

The SDK application 223 can be installed as a plug-in for carrying out a functionality expansion of the image forming apparatus 10 after delivering the image forming apparatus 10. Referring to FIG. 3, an SDK application 223a, an SDK application 223b, and an SDK application 223c are exemplified. In the embodiment, the SDK application 223a is installed by using the Java ("Java" is a registered trademark), and delivered in a form of intermediate code (executable code) called Java ("Java" is a registered trademark) byte code. The SDK application 223 causes the operation panels 15 of the image forming apparatus 10 to display a display component (Graphical User Interface (GUI)) such as a screen, and actually installed as a localized or closed application which is ordinarily used as a display component. Said differently, the SDK application 223 does not ordinarily aim to provide a function to other programs such as an application inside or outside the image forming apparatus 10 so as to function as the server. The SDK application 223 is interactively used by the user and realizes one complete function (job). An example form of the local application is Xlet operated under a circumstance of Connected Device Configuration (CDC) of Java ("Java" is a registered trademark).

With the embodiment, an example that the local SDK application 223 is partly used by another program is described.

The SDK platform 224 is an application platform of the SDK application 223 for providing an execution environment of the SDK application 223. The SDK applications 223 are developed by using an application program interface (API) provided by the SDK platform 224. The Application Program Interface (API) of the SDK platform 224 is open to public. Therefore, the SDK application 223 may be developed by a third-party vendor or the like. The API is specifically an assembly of functions, methods, or the like. In an expanded sense, a mechanism of reporting an event asynchronously generated to the SDK application 223 is included in the API.

Referring to FIG. 3, the SDK platform 224 includes a virtual machine 2241, an application administrating unit 2242, a WEB application server unit 2243, and so on. The virtual machine 2241 is a program converting an intermediate code (bytecode of Java) of the SDK application 223 to a code suitable for the CPU 111. An example in which a virtual machine (VM) 2241 of Java is employed in the embodiment is described.

The WEB application server unit 2243 is a program realizing a WEB server environment. For example, the WEB application server unit 2243 has an opened port for receiving an HTTP request (including Simple Object Access Protocol (SOAP) request), and calls for a program module corresponding to a Uniform Resource Locator (URL) designated by a request received by the port.

The application administrating unit 2242 provides a user interface related to an administration operation of the SDK application 223 and carries out a process corresponding to the request input via the user interface. The administrating operation of the SDK application 223 may be installation, activation, stop, uninstallation or the like of the SDK application 223. The application administration unit 2242 carries out processes to cause the SDK application 223 to be a remote or open application. With the process, the SDK application 223 is changed to the WEB service. Various methods of the SDK application 223 becomes usable from other programs inside and outside the image forming apparatus as interfaces of the WEB service.

Figure 4:
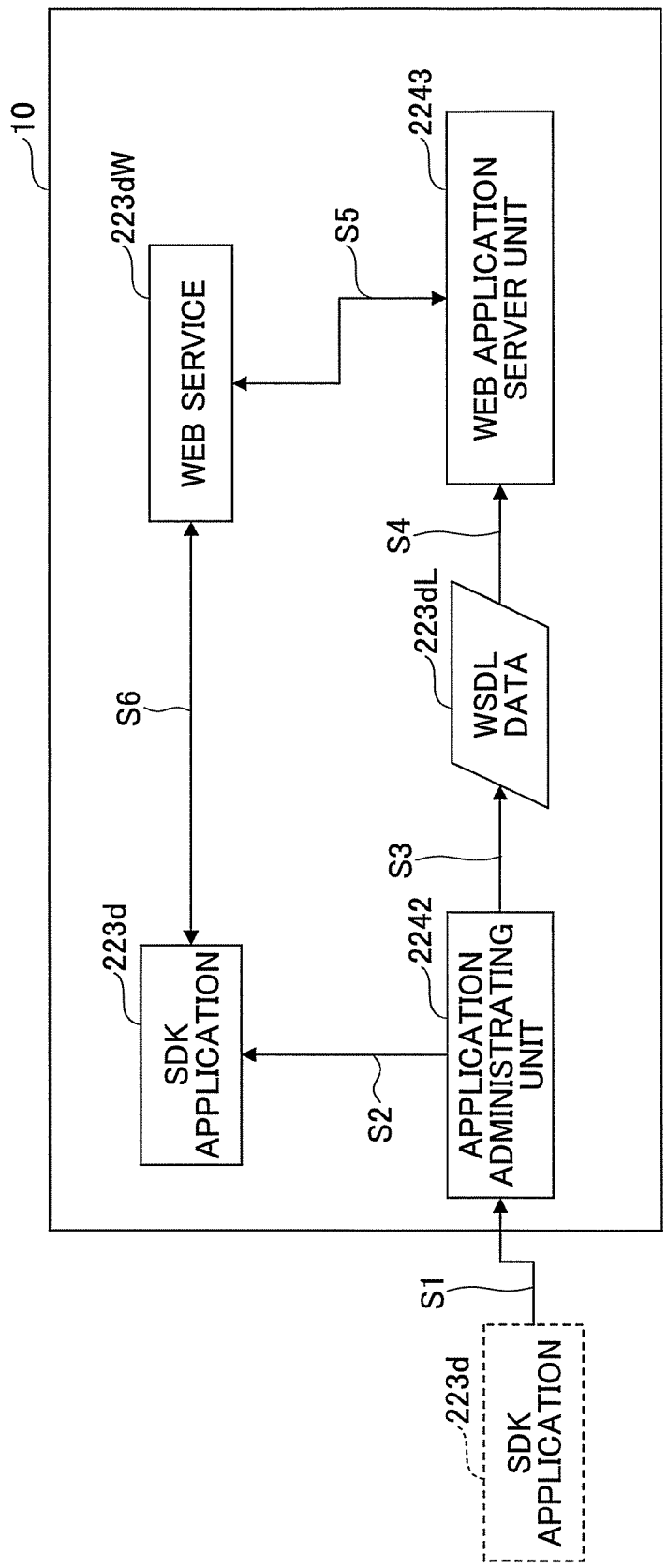
FIG. 4 is a view for illustrating a Web service an SDK application.

The WEB service of the SDK application 223 is further described in detail. FIG. 4 is a view for illustrating the Web service of the SDK application. Referring to FIG. 4, an example in which the SDK application is changed to the WEB service is illustrated.

The application administrating unit 2242 may install the SDK application 223d in the image forming apparatus 10 in response to an installation instruction (step S1) of the SDK application 223d in step S2. The SDK application 223d analyzes the intermediate code of the SDK application 223d in association with the installation and generates Web Services Description Language (WSDL) data 60 corresponding to the SDK application 223d in step S4. Therefore, the SDK application 223 is not limited to the application actually implemented by the Java language. However, it may be necessary to extract interface information from the intermediate code.

The WSDL is a language specification for describing an interface specification of WEB service based in an eXtensible Markup Language (XML). Therefore, the WSDL data 223dL includes description about an interface specification of a method which is owned by the SDK application 223d. As described, the SDK application 223d is a local application. Therefore, a method owned by the SDK application 223d is not implemented to allow the other programs to externally use. However, this does not mean that the method is limited to a private method which is accessed from an outside of a class.

The WEB application server 2242 reads the WSDL data 223dL and deploys the WEB service 223dW for providing an interface to the method related to a definition recorded in the WSDL data 223dL in step S5. An object is exemplified as an entity of the WEB service 223dW. In this case, in step S5, an object is generated to have a method defined in the WSDL data 223dL. The other applications are then enabled to transparently call for a method of SDK application 223d via the WEB application server unit 2243 and the WEB service 223dW. Then, it becomes possible to partly use the function of the SDK application 223d. At this time, the SDL application 223d is referred to as being in a state of WEB service in this embodiment.

Figure 5:
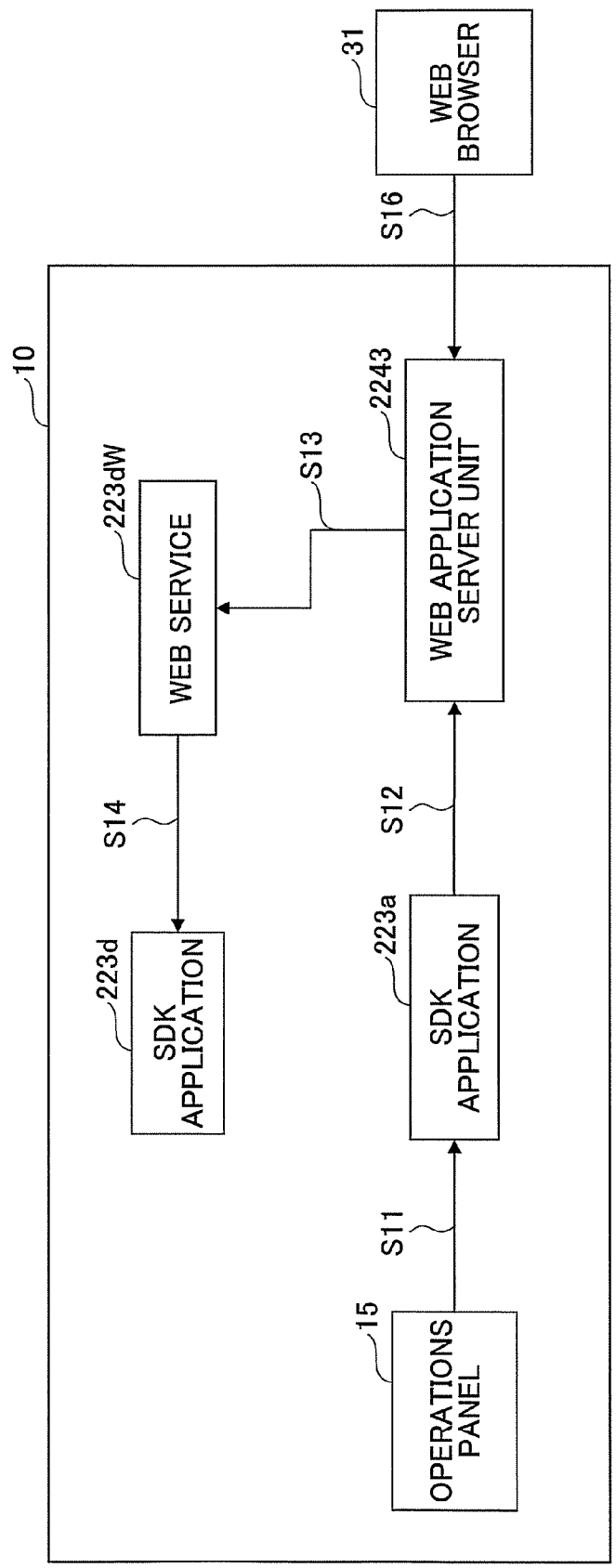
FIG. 5 illustrates an example of a procedure (method calling procedure) for calling for a method of the SDK application which is provided for Web service.

FIG. 5 illustrates an example of a procedure (method calling procedure) for calling for a method of the SDK application which is provided for Web service. Referring to FIG. 5, the same reference symbols as in FIG. 4 are attached to the same portions.

For example, when the SDK application 223a is used via the operations panel 15 in step S11, the SDK application 223a is implemented to use a part of the function of the SDK application 223d. When the SDK application 223a partly uses the function of the SDK application 223d, an SOAP request, in which identification information for the partly used function (i.e., a URL corresponding to a subject providing the partly used function and a method name corresponding to the partly used function), is designated by an internal communication in the image forming apparatus 10, is sent to the WEB application server unit 2243 is step S12. The WEB application server unit 2243 calls for the URL designated by the SOAP request and the method corresponding to the method name to the WEB service 223dW in step S13. The WEB service 223dW calls for the method corresponding to the called method to the SDK application 223d in step S14. The SDK application 223d carries out the process implemented by the called method and returns the result to the WEB service 223dW. The result is returned as a SOAP response to the SDK application 223a in a sequence reverse to the above call.

The method of the SDK application 223d which is provided for Web service is then enabled to be used from an outside of the image forming apparatus 10 via the network. Referring to FIG. 5, a mode of using the SDK application 223d in response to an HTTP request from the WEB browser 31 is illustrated in step S16. When the WEB application server unit 2243 receives the HTTP request, the application server 2243 calls for the method corresponding to the URL designated by the HTTP request from the WEB service 223dW in step S13. The subsequent processes are the same as illustrated in the above.

Next, a conversion from the intermediate code (bytecode of Java) to the WSDL is described. The WSDL ordinarily has the following form.

Figure 6:
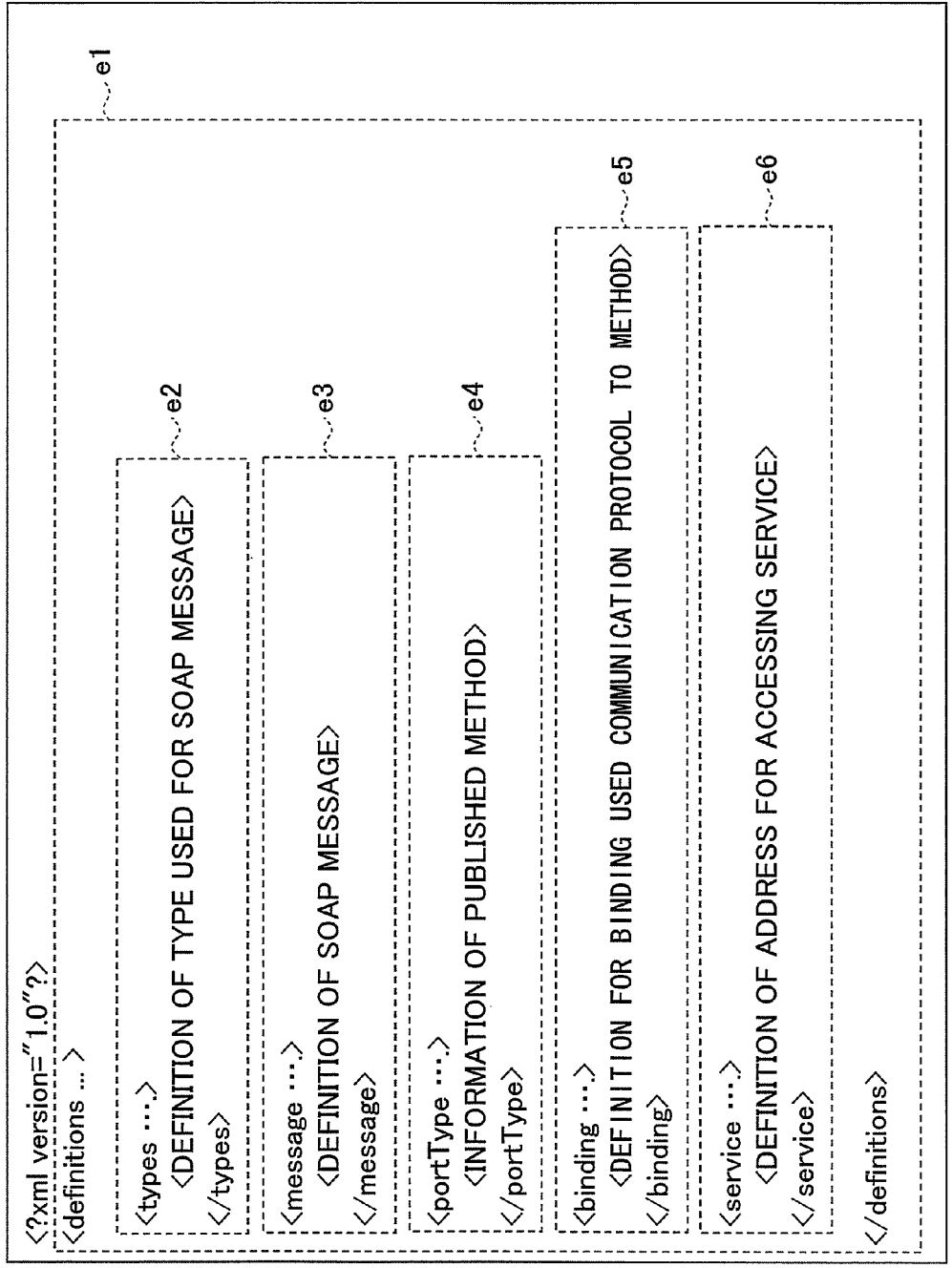
FIG. 6 illustrates a form of Web Services Description Language (WSDL).

FIG. 6 illustrates the form of the WSDL. As illustrated in FIG. 6, the WSDL has a root element of definitions element e1 surrounded by a tag of <definitions>. The definitions element e1 includes a types element e2, a types element e3, a portType element e4, a binding element e5, a service element e6, or the like as a child element.

The types element e2 includes a data type definition used in the SOAP message. The message element e3 includes a definition of the SOAP message (request, response or the like). The portType element e4 includes information of a method published as a WEB service. The binding element e5 includes a definition for binding a communication protocol to be used to a method. The service element e6 includes an address (URL) for accessing the service (method).

Figure 7:
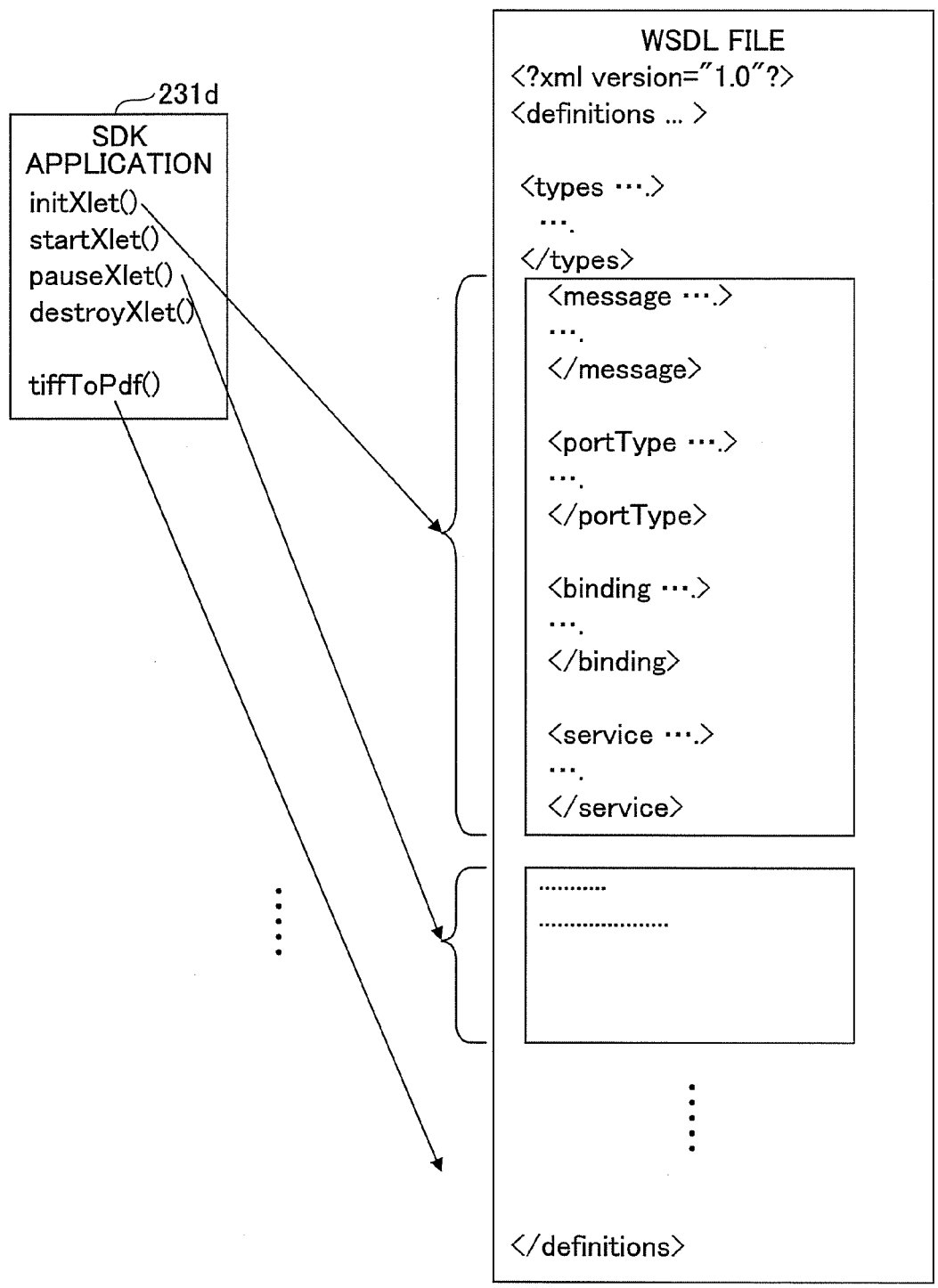
FIG. 7 illustrates a relationship between a method and components of WSDL.

The message element e3, the portType element e4, the binding element e5, and the service element e6 are described for each method as illustrated in FIG. 7.

FIG. 7 illustrates a relationship between the method and each component of the WSDL. Referring to FIG. 7, the SDK application 223d includes methods such as initXlet( ), startXlet( ), pauseXlet( ), destroyXlet( ), tiffToPdf( ) or the like. The message element e3, the portType element e4, the binding element e5 and the service element e6 are described for each method.

A specific mode of changing from the intermediate code to the WSDL is described. FIG. 8 illustrates a defined example of a method in an intermediate code of the SDK application. Referring to FIG. 8, examples of interface specifications of initXlet( ), startXlet( ), pauseXlet( ), destroyXlet( ), tiffToPdf( ) or the like are defined. Based on the definition, the application administrating unit 2242 generates WSDL data including the description illustrated in FIG. 9.

FIG. 9 illustrates an example of the WSDL. Referring to FIG. 9, a description related only to the tiffToPdf( ) method is described for convenience. Referring to FIG. 9, elements corresponding to elements described in FIG. 6 have reference symbols the same as those of FIG. 6. Detailed description of the elements is omitted since the description is within specifications of the WSDL. There are as many as two message elements e3. One of the message elements e3 relates to an SOAP message (tiffToPdfRequest) related to the request, and the other is a message element related to a response.

A description e61 inside the service element e6 indicates the URL for the Scan2Pdf service. The Scan2Pdf is the name of a WEB service used when the SDK application is provided for the Web service.

Conversion of the intermediate code of Java to the WSDL can be mechanically carried out. For example, a conversion tool such as Java2WSDL of Apache Axis is obtainable in the market. In the embodiment, a detailed description of conversion logic from the intermediate code to the WSDL is omitted.

Figure 10:
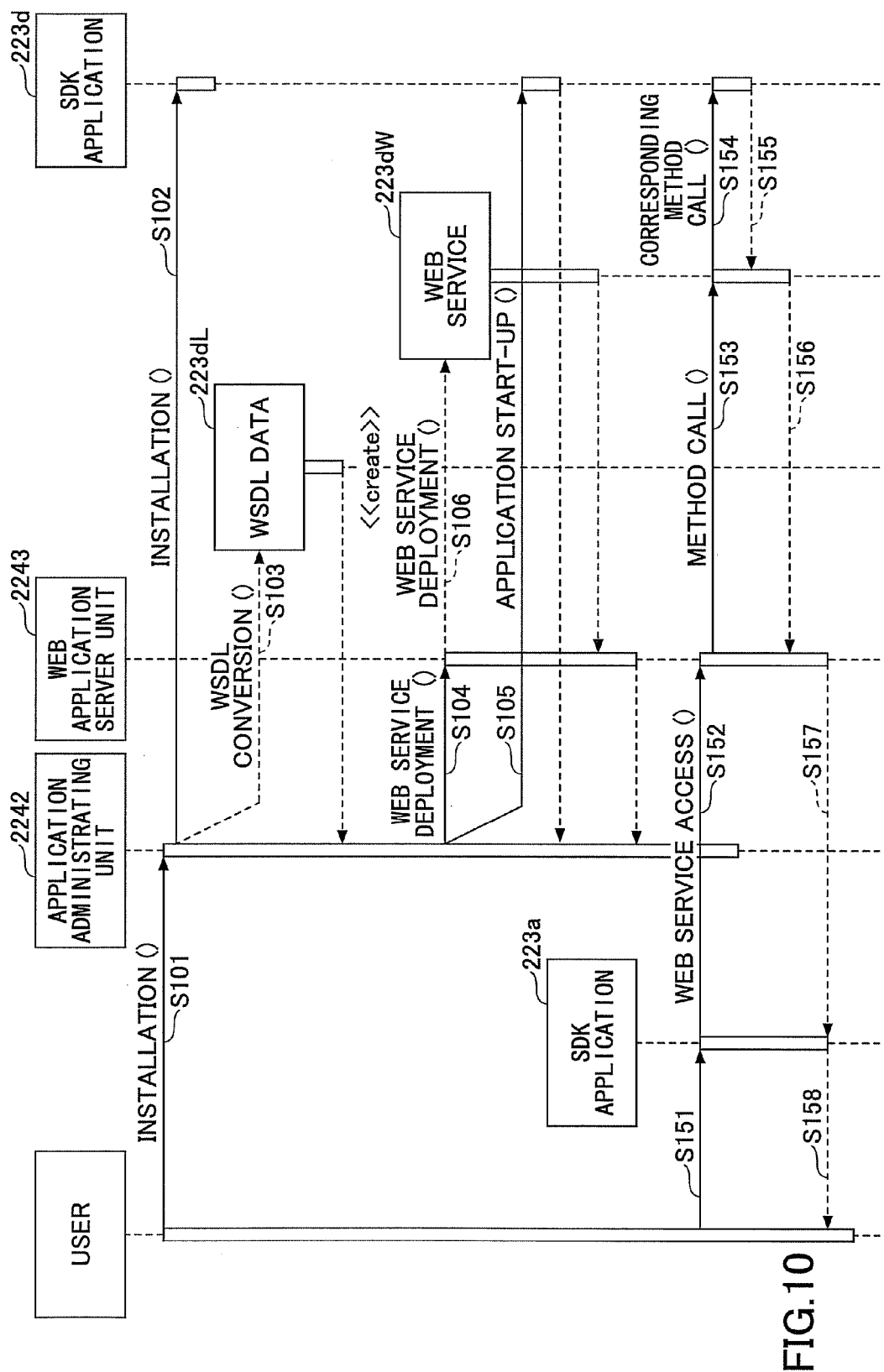
FIG. 10 is a sequence chart explaining a procedure of providing an SDK application to a Web service and a procedure of calling for a method of the SDK application to the Web service.

Hereinafter, the procedure of the image forming apparatus 10 is described. FIG. 10 is a sequence chart explaining a procedure of providing an SDK application to the Web service and a procedure of calling the Web service for a method of the SDK application. Referring to FIG. 10, a sequence chart of the processes described with reference to FIG. 4 and FIG. 5 is described.

Figure 11:
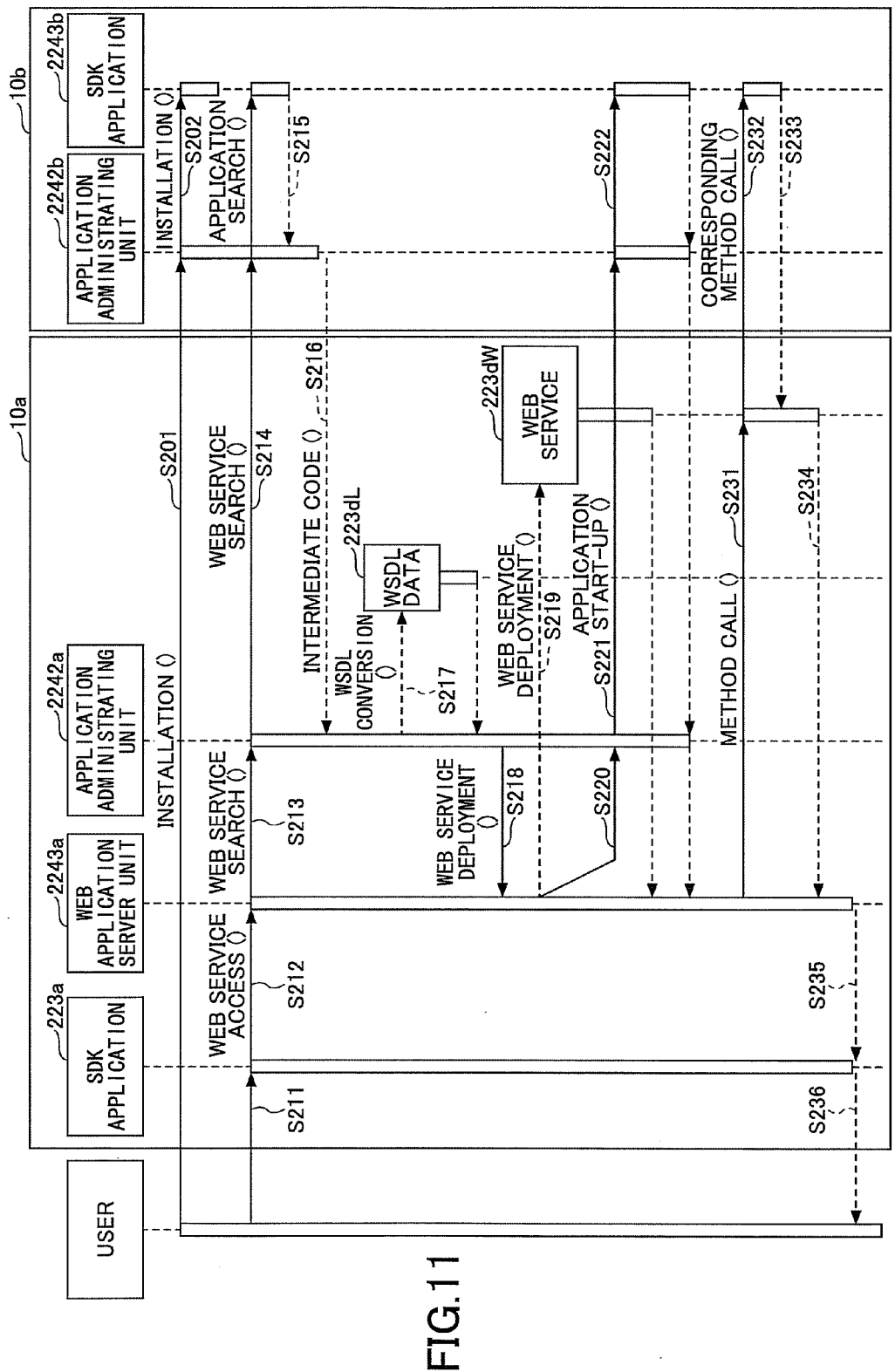
FIG. 11 is an example sequence diagram illustrating a procedure of using an SDK application installed in another image forming apparatus by providing the SDK application to a Web service.

At the initial stage of FIG. 11, the SD card 80 in which the SDK application 223d is recorded is inserted into the SD card slot 17. An installation screen is displayed on the operations panel 15 by the application administrating unit 2242.

When an instruction to install is inputted via the installation screen in step S101, the application administrating unit 2242 installs the SDK application 223d in the image forming apparatus 10 in step S102. The application administrating unit 2242 analyzes the intermediate code of the SDK application 223d along with the installation, and generates the WSDL data 223dL in step S103.

Next, the application administrating unit 2242 inputs the WSDL data 223dL to the WEB application server unit 2243 thereby requesting to deploy the WEB service in step S104. The application administrating unit 2242 activates the installed SDK application 223d in step S105. When the SDK application has been provided for the Web service, it is impossible to use the functions of the SDK application 223d if the installed SDK application 223d is not activated.

The WEB application server unit 2243 which has received the deploy request of the WEB service analyzes and comprehends the WSDL data 223dL and deploys the WEB service 223dW providing an interface to the method defined in the WSDL data 223dL in step S106. With the deploy of the WEB service 223dW, the SDK application 223d provided for Web service is completed.

Next, when the SDK application 223a is used via the operations screen of the application administrating unit 2242, the SDK application 223a causes the operations screen of the SDK application 223a to be displayed on the operations panel 15 of the image forming apparatus 10.

When an instruction to execute the job is input in the SDK application 223a in step S151, the SDK application 223a transmits the SOAP request, in which the URL for the WEB service 223dL and the method name of the tiffToPdf( ) is designated, to the WEB application server unit 2243 in step S152.

The WEB application server unit 2243 carries out the call of the method of which method name is designated by the SOAP request to the WEB service 223dW corresponding to the URL designated by the SOAP request in step S153. The WEB service 223dW calls the SDK application 223d for the method (tiffToPdf( )) corresponding to the called method in step S154. The SDK application 223d carries out the process implemented by the called method and returns the result to the WEB service 223dW in step S155. The WEB service 223dW returns the processed result to the WEB application server unit 2243 in step S156. The WEB application server unit 2243 returns an SOAP response including the processed result to the SDK application 223a in step S157. The SDK application 223a causes the display state of the screen to be changed in response to the processed result in step S158.

Next, an example in which the SDK application 223 is provided for the Web service is described.

FIG. 11 is an example sequence diagram illustrating a procedure of using the SDK application installed in another image forming apparatus by providing the SDK application to the Web service.

Referring to FIG. 11, two image forming apparatuses 10a and 10b are illustrated. An SDK application 223d is installed in the image forming apparatus 10b. The image forming apparatus 10a uses the SDK application 223d installed in the image forming apparatus 10b after the SDK application is provided for the Web service. The reference symbols of software included in the image forming apparatuses 10a and 10b have "a" or "b" corresponding to the final digits of the reference symbols of the image forming apparatuses 10a and 10b. However, this naming method is not applicable to the SDK applications 223a and 223d.

At first, the image forming apparatus 10b is operated. Referring to FIG. 11, the image forming apparatus 10b is in the same initial state as the initial state of the image forming apparatus 10 illustrated in FIG. 10. Specifically, a user inputs an install instruction via an install screen of the image forming apparatus 10b in step S201. The application administrating unit 2242b installs the SDK application 223d in the image forming apparatus 10b in step S202. The application administrating unit 2242b administrates a list of the installed attribute information of the SDK application 223d. The attribute information may be acquired from an attribute file included in the package file (archival file) of the SDK application 223d. The attribute information includes identification information of the SDK application 223d. The application administrating unit 2242b can specify a location of an entity (e.g., class file) of the SDK application 223d and access the entity based on the identification information.

Next, the user operates the image forming apparatus 10a. There may be passage of a few days from the operation in the image forming apparatus 10b to the operation in the image forming apparatus 10a.

When viewed from the user, the step S211 shows the same state as that in the step S151 of FIG. 10. Said differently, when the SDK application 223a is used via the operations screen of the application administrating unit 2242a, the SDK application 223a causes the operations screen of the SDK application 223a to be displayed on an operations panel 15a of the image forming apparatus 10a. When an instruction to execute a job is input in the SDK application 223a in step S211, the SDK application 223a transmits a SOAP request, in which the URL for the WEB service 223dL and the method name of the tiffToPdf( ) is designated, to a WEB application server unit 2243a in step S212.

The WEB application server unit 2243a requests the application administrating unit 2242a to search the WEB service when the WEB service 223dW corresponding to the URL designated by the SOAP request is not deployed in step S213.

In the search request, the service name "ScanToPdf" included in the end of the URL is designated.

The application administrating unit 2242a analyzes the intermediate code of the SDK application 223 installed in the image forming apparatus 10a and determines whether the SDK application 223 including the "ScanToPdf" class exists. When the SDK application 223a including the class is not installed in the image forming apparatus 10a, the application administrating unit 2242a transfers the search request to the application administrating unit 2242b of the image forming apparatus 10b in step S214. The IP addresses of the image forming apparatuses 10 to be used in association with the WEB service are previously set up in the image forming apparatuses 10 and stored in, for example, the HDD 114. In the following description, the image forming apparatus 10b is set so as to associate the image forming apparatus 10a.

The application administrating unit 2242a analyzes the intermediate code of the SDK application 223 installed in the image forming apparatus 10b and determines whether the SDK application 223 including the "ScanToPdf" class exists. Referring to FIG. 11, the SDK application 224d is searched in step S215. The application administrating unit 2242b returns the intermediate code of the SDK application 224d to the application administrating unit 2242a in step S216. The image forming apparatuses 10 analyzes the intermediate code of the SDK applications 223 and extracts the interface information (list information of the classes) before the SDK application 223 is directly installed.

The application administrating unit 2242a analyzes the intermediate code (class file) of the SDK application 223d along with the installation, and generates the WSDL data 223dL in step s217. Next, the application administrating unit 2242 inputs the WSDL data 223dL to the WEB application server unit 2243a thereby requesting to deploy the WEB service in step S218. The WEB application server unit 2243a which has received the deploy request of the WEB service analyzes and comprehends the WSDL data 223dL and deploys the WEB service 223dW providing an interface to the method defined in the WSDL data 223dL in step S219.

In step S220, the WEB application server unit 2243a requests the application administrating unit 2242a to start the SDK application 223d corresponding to the WEB service which is requested to be searched in step S213. In step S221, in response to the request, the application administrating unit 2242a sends an instruction of activating the SDK application 223d to which the intermediate code is transferred in step S216. The application administrating unit 2242b activates the SDK application 223d in the image forming apparatus 10b in step S222.

In step S231, when the SDK application 223d is activated in the image forming apparatus 10b, the WEB application server 2243a calls the WEB service 223dW corresponding to the URL designated by the SOAP request for the method of which name is designated by the SOAP request received in step S212. The WEB service 223dW calls the SDK application 223d for the method (tiffToPdf( )) corresponding to the called method in step S232. The method of the SDK application 223d is called by the WEB service 223dW by using, for example, a scheme of Remote Procedure Call (RPC) installed in the virtual machine 2241.

The SDK application 223d carries out the process implemented by the called method and returns the result to the WEB service 223dW in step S233. The WEB service 223dW returns the processed result to the WEB application server 2243a in step S234. The WEB application server 2243 returns an SOAP response including the processed result to the SDK application 223a in step S235. The SDK application 223a causes the display state of the screen to be changed in response to the processed result in step S236.

As described, with the embodiment, the method of the SDK application 223 can be called from the outside. It becomes possible to partly use the function of the SDK application 223.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority or inferiority of the invention. Although the embodiment of the present invention has been described in detail, it should be understood that various changes, substitutions, and alterations could be made thereto without departing from the spirit and scope of the invention.

This patent application is based on Japanese Priority Patent Application No. 2010-056699 filed on Mar. 12, 2010, the entire contents of which are hereby incorporated herein by reference.

What is claimed is:

1. A hardware apparatus in which an application program is installable, the hardware apparatus comprising:
   a processor configured to implement
      an installing unit that installs a first application program including a method in the hardware apparatus,
      an interface information extracting unit that analyzes an intermediate code of the first application program during the installation of the first application program and extracts interface information of the method from the intermediate code of the first application program to generate a data defined so as to provide an interface for the method, the method corresponding to identification information for accessing a Web service, and
      an interface providing unit that deploys the Web service as the interface for the method based on the data defined so as to provide the interface for the method after an activation of the installed first application program is started; and
   a display unit for receiving a request for executing a second application program that is a plug-in for carrying out a functionality expansion of the hardware apparatus so as to use a part of the function of the first application program and is additionally installed in the hardware apparatus,
   wherein the interface providing unit calls the method of the first application program corresponding to the identification information in response to a SOAP request including the identification information of the method sent from the second application to the interface providing unit,
   wherein when the display unit receives the request for executing the second application program, the second application program sends the identification information for accessing the Web service to the interface providing unit, the interface providing unit calls the method designated by the identification information from the Web service, the first application program is performed so as to process the method and returns a processed result to the Web service, the Web service returns the processed result to the interface providing unit, the interface providing unit returns a SOAP response including the processed result to the second application program, and the second application program changes a display state of the display unit in response to the processed result.

2. The hardware apparatus according to claim 1,
wherein the interface information extracting unit converts the interface information to definition data in which definition related to the method is described based on a predetermined language specification, and the interface providing unit comprehends the definition data and provides the interface for the method.

3. The hardware apparatus according to claim 2,
wherein the predetermined language specification is WSDL, and the interface providing unit calls the first application program for a URL corresponding to the method and the method corresponding to a method name in response to a request including the URL and the method name.

4. The hardware apparatus according to claim 1,
wherein the display unit receives a request for executing the second application program that is the plug-in for carrying out the functionality expansion of the hardware apparatus so as to use the part of the function of the first application program by calling the method of the first application program.

5. An information processing method comprising:
installing, with an installing unit, a first application program including a method in an electronic apparatus;
analyzing, with the electronic apparatus in which an application program is installable, an intermediate code of the first application program during the installing, with the installing unit, the first application program;
extracting, with the electronic apparatus, interface information of the method from the intermediate code of the first application program to generate a data defined so as to provide an interface for the method, the method corresponding to identification information for accessing a Web service;
deploying, with the electronic apparatus, the Web service as the interface corresponding to the method based on the data defined so as to provide the interface for the method after an activation of the installed first application program is started; and
receiving, with a display unit included in the electronic apparatus, a request for executing a second application program that is a plug-in for carrying out a functionality expansion of the hardware apparatus so as to use a part of the function of the first application program and is additionally installed in the hardware apparatus,
wherein the deploying calls the method of the first application program corresponding to the identification information in response to a SOAP request including the identification information of the method sent from the second application to the interface providing unit,
wherein when the display unit receives the request for executing the second application program, the second application program sends the identification information for accessing the Web service to the interface providing unit, the deploying calls the method designated by the identification information from the Web service, the first application program is executed so as to process the method and returns a processed result to the Web service, the Web service returns the processed result to the interface providing unit, the interface providing unit returns a SOAP response including the processed result to the second application program, and the second application program changes a display state of the display unit in response to the processed result.

6. The information processing method according to claim 5,
wherein the extracting converts the interface information to definition data in which definition related to the method is described based on a predetermined language specification, and
the deploying comprehends the definition data and provides the interface for the method.

7. The information processing method according to claim 6,
wherein the predetermined language specification is WSDL, and
the deploying calls the first application program for a URL corresponding to the method and the method corresponding to a method name in response to a request including the URL and the method name.

8. The information processing method according to claim 5,
wherein, in the receiving, the request for executing the second application program that is the plug-in for carrying out the functionality expansion of the hardware apparatus is received so as to use the part of the function of the first application program by calling the method of the first application program.

9. A non-transitory recording medium storing an information processing program containing instructions executable by a processor included in an electronic apparatus in which an application program is installable to perform the steps of:
installing, with an installing unit, a first application program including a method in an electronic apparatus;
analyzing, with the electronic apparatus in which an application program is installable, an intermediate code of the first application program during the installing, with the installing unit, the first application program;
extracting, with the electronic apparatus, interface information of the method from the intermediate code of the first application program to generate a data defined so as to provide an interface for the method, the method corresponding to identification information for accessing a Web service;
deploying, with the electronic apparatus, the Web service as the interface corresponding to the method based on the data defined so as to provide the interface for the method after an activation of the installed first application program is started; and
receiving, with a display unit included in the electronic apparatus, a request for executing a second application program that is a plug-in for carrying out a functionality expansion of the hardware apparatus so as to use a part of the function of the first application program and is additionally installed in the hardware apparatus,
wherein the deploying calls the method of the first application program corresponding to the identification information in response to a SOAP request including the identification information of the method sent from the second application to the interface providing unit,
wherein when the display unit receives the request for executing the second application program, the second application program sends the identification information for accessing the Web service to the interface providing unit, the deploying calls the method designated by the identification information from the Web service, the first application program is executed so as to process the method and returns a processed result to the Web service, the Web service returns the processed result to the interface providing unit, the interface providing unit returns a SOAP response including the processed result to the second application program, and the second application program changes a display state of the display unit in response to the processed result.

10. The non-transitory recording medium according to claim 9,
wherein the extracting converts the interface information to definition data in which definition related to the method is described based on a predetermined language specification, and
the deploying comprehends the definition data and provides the interface for the method.

11. The non-transitory recording medium according to claim 10,
wherein the predetermined language specification is WSDL, and the deploying calls the first application program for a URL corresponding to the method and the method corresponding to a method name in response to a request including the URL and the method name.

12. The non-transitory recording medium according to claim 9,
wherein, in the receiving, the request for executing the second application program that is the plug-in for carrying out the functionality expansion of the hardware apparatus is received so as to use the part of the function of the first application program by calling the method of the first application program.

* * * * *